United States Patent
Wagner

(10) Patent No.: US 9,266,561 B2
(45) Date of Patent: Feb. 23, 2016

(54) METHOD AND DEVICE FOR ADAPTING THE BOOST RATE OF A STEERING SYSTEM OF A MOTOR VEHICLE DURING TIRE PRESSURE LOSS

(71) Applicant: Robert Bosch GmbH, Stuttgart (DE)

(72) Inventor: Marcus Wagner, Lauffen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/638,706

(22) Filed: Mar. 4, 2015

(65) Prior Publication Data

US 2015/0251694 A1 Sep. 10, 2015

(30) Foreign Application Priority Data

Mar. 4, 2014 (DE) .......................... 10 2014 203 932

(51) Int. Cl.
| | |
|---|---|
| *B62D 6/00* | (2006.01) |
| *B62D 15/02* | (2006.01) |
| *B62D 5/00* | (2006.01) |
| *B62D 5/04* | (2006.01) |

(52) U.S. Cl.
CPC .............. *B62D 6/001* (2013.01); *B62D 5/008* (2013.01); *B62D 5/0481* (2013.01); *B62D 5/0484* (2013.01); *B62D 6/002* (2013.01); *B62D 15/026* (2013.01)

(58) Field of Classification Search
CPC ...... B62D 6/001; B62D 6/002; B62D 5/0481; B62D 5/0484; B62D 5/008; B62D 15/026
See application file for complete search history.

(56) References Cited

U.S. PATENT DOCUMENTS

| | | | | |
|---|---|---|---|---|
| 8,849,537 | B2* | 9/2014 | Yoon ..................... | B60W 30/02 701/1 |
| 9,085,205 | B2* | 7/2015 | Son ........................ | B60C 15/20 701/22 |
| 2004/0026158 | A1* | 2/2004 | Rieth ..................... | B62D 5/003 180/402 |
| 2005/0137772 | A1* | 6/2005 | Smakman ............. | B60T 8/1755 701/70 |
| 2005/0279562 | A1* | 12/2005 | Hara ...................... | B62D 5/003 180/402 |
| 2006/0131096 | A1* | 6/2006 | Ono ....................... | B62D 5/008 180/400 |
| 2011/0238251 | A1* | 9/2011 | Wright ................... | B60L 15/20 701/22 |
| 2015/0105981 | A1* | 4/2015 | Hestermeyer ........ | B62D 5/0463 701/41 |

OTHER PUBLICATIONS

"Proposed amendments to the claims"; authored by Aaron Deditch; recieved on: Oct. 15, 2015.*

* cited by examiner

*Primary Examiner* — James Trammell
*Assistant Examiner* — James E Stroud
(74) *Attorney, Agent, or Firm* — Kenyon & Kenyon LLP

(57) ABSTRACT

A method for adapting the boost factor of a steering system of a motor vehicle during tire pressure loss, in which the occurrence of a tire pressure loss is ascertained, the intensity of the pressure loss exceeding a specified threshold value, and in the presence of a pressure loss exceeding the threshold value, the boost factor of the steering system is reduced.

12 Claims, 2 Drawing Sheets

METHOD AND DEVICE FOR ADAPTING THE BOOST RATE OF A STEERING SYSTEM OF A MOTOR VEHICLE DURING TIRE PRESSURE LOSS

RELATED APPLICATION INFORMATION

The present application claims priority to and the benefit of German patent application no. 10 2014 203 932.0, which was filed in Germany on Mar. 4, 2014, the disclosure of which is incorporated herein by reference.

FIELD OF THE INVENTION

The present invention relates to a method and device for adapting the boost rate of a steering system of a motor vehicle during tire pressure loss.

BACKGROUND INFORMATION

Active steering systems are known from the related art, in which an additional steering angle is impressed upon the driver's steering angle, using an electric motor and a planetary gear. This system may be used to control the steering transmission depending on the situation and to undertake driving stabilization interventions via the control of the wheels. This active steering is also used as power steering, in order to set a boosting of the steering motion as a function of speed. Furthermore, various systems are known for monitoring tire air pressure. These are able to work directly with a pressure sensor in the tire or be based on an evaluation of the rotational speed of the wheels. In this context, air pressure that is too low is indicated to the driver using a warning light.

SUMMARY OF THE INVENTION

The present invention relates to a method for adapting the boost rate or boost factor of a steering system of a motor vehicle during tire pressure loss, in which
the occurrence of a tire pressure loss is ascertained, the intensity of the pressure loss exceeding a specified threshold value and
in the presence of a pressure loss exceeding the threshold value, the boost factor of the steering system is reduced.
The effects of a panic reaction by the driver upon the occurrence of a tire pressure loss are thereby reduced in a simple manner.

One embodiment of the present invention is characterized in that the reduction in the boost factor takes place in time according to a specified function, particularly a linear function. Because of that, the driver is not suddenly surprised by the reduction in the boost factor.

One embodiment of the present invention is characterized in that the reduced boost factor is maintained during a time interval of specified length.

One embodiment of the present invention is characterized in that the reduced boost factor is retained until a stable driving state of the motor vehicle is detected at very low speed, for example. Alternatively, the reduced boost factor may also be retained until the vehicle's longitudinal speed falls below a specified threshold value.

One embodiment of the present invention is characterized in that, after the expiration of the time interval of specified length and the reaching of a stable driving state or falling below a threshold value by the vehicle's longitudinal speed, the boost factor is raised again according to a specified function.

One embodiment of the present invention is characterized in that the value of the boost factor, that is increased again, is less than the standard value of the boost factor when there is no tire pressure loss.

One embodiment of the present invention is characterized in that the steering system is a power steering system or an active steering system.

One advantageous embodiment of the present invention is characterized in that the threshold value for the pressure loss is selected to be so high that, when it is exceeded, a nearly pressure-less tire or a burst tire is present.

One advantageous embodiment of the present invention is characterized in that the driver is informed on the reduction of the boost factor and/or the increase of the boost factor.

Furthermore, the present invention includes a device especially configured for implementing one of the methods claimed above. This context particularly involves a control unit which is equipped with the program code for carrying out the method according to the present invention.

DETAILED DESCRIPTION

Various investigations have shown that tire blowouts or tread separations are mostly noncritical as long as the driver reacts to them only with slight steering motions and brakes only slightly. The situation becomes critical and leads to skidding only by an overreaction of the driver, using vehement steering motions and very strong braking.

Figure 1:
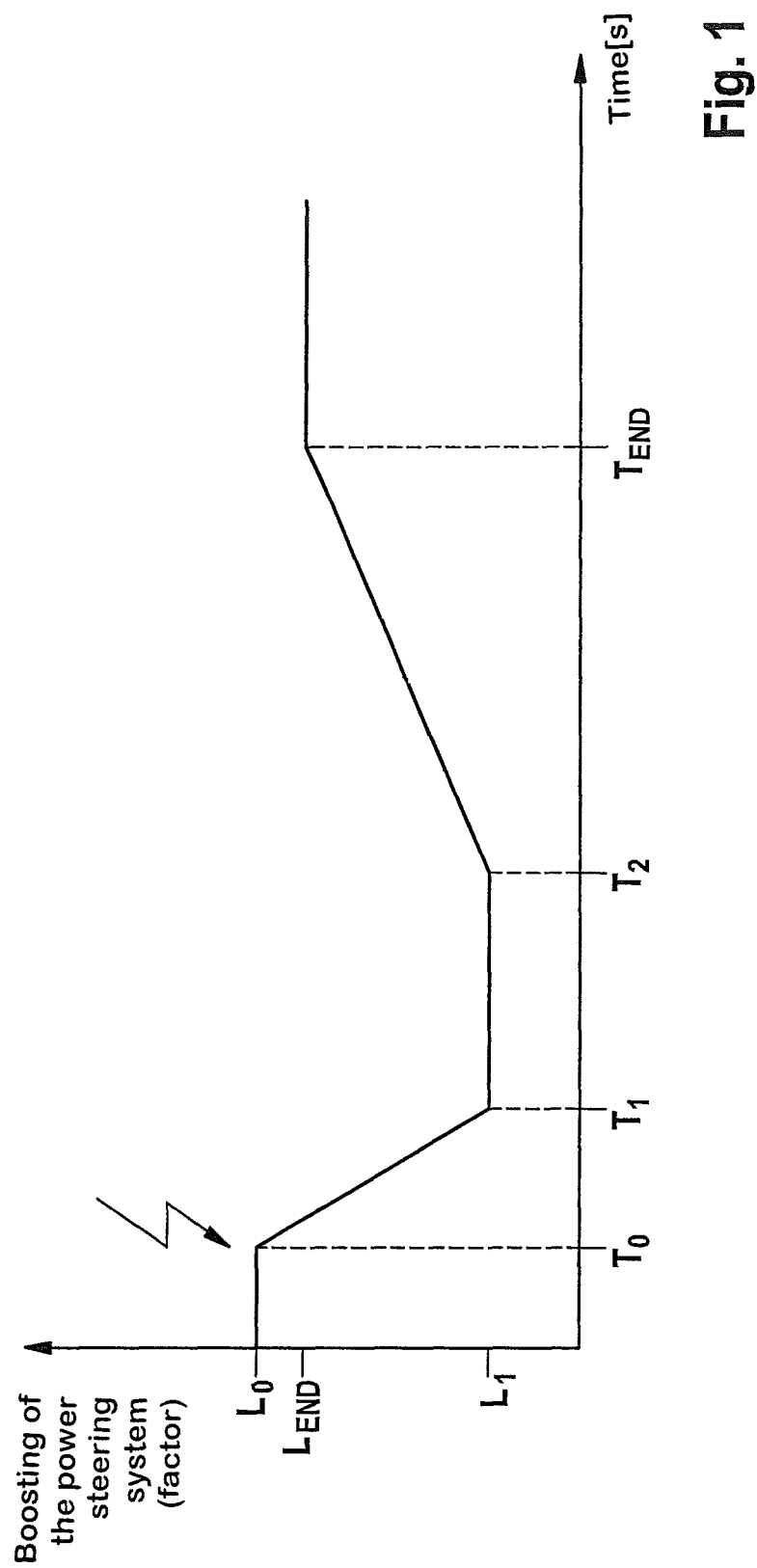
FIG. 1 shows the curve over time of the boosting of a power steering system.

In the present invention, the boosting or the boost factor of a power steering system or an active steering is reduced directly after the detection of a strong tire pressure loss. This can be seen in FIG. 1. There, in the abscissa direction, time is plotted in seconds, and in the ordinate direction, the boost factor is plotted of a power steering system. In the normal state, this boost factor has the value $L_0$. At time $T_0$, a sudden tire pressure loss occurs and is detected by the tire pressure monitoring system. Thereupon, the boosting up to time $T_1$ is driven down to the value $L_1$ where $L_1<L_0$. Consequently, steering is made more difficult and the influence of the overreaction of the driver is reduced. At time $T_2$, when the vehicle is traveling again in a stable manner, the boosting may be increased again from $L_1$ to a value $L_{END}$. The value $L_{END}$ is reached at time $T_{END}$. That being the case, travel may be continued up to a safe standstill. In this instance, the value $L_{END}$ may be different from $L_0$ or $L_1$. In particular, $L_{END}$ is less than $L_0$ and greater than $L_1$. It is meaningful for the driver to be informed on the dropping and the raising of the boost factor, for instance, by a warning display or a warning announcement.

Figure 2:
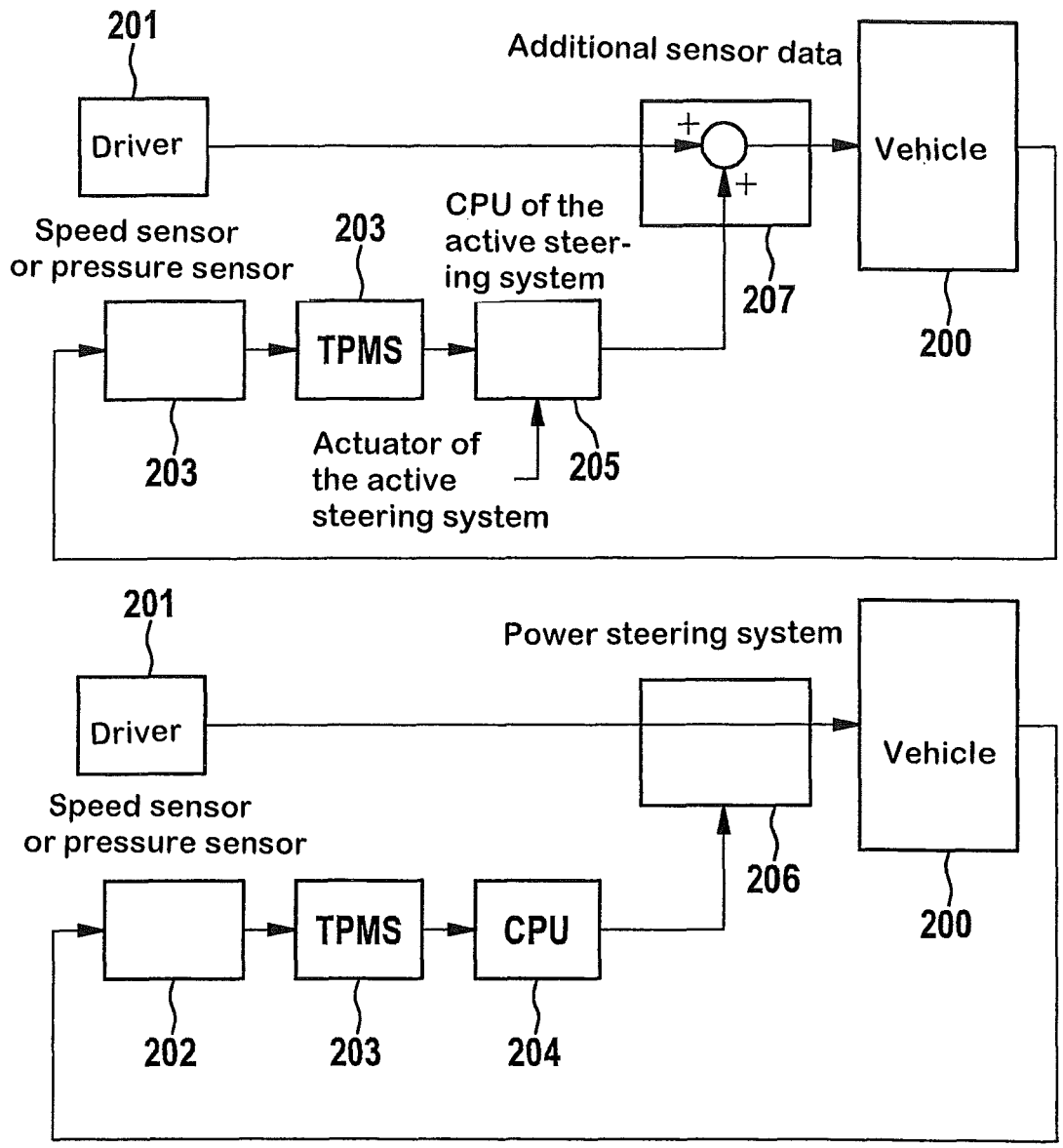
FIG. 2 shows, in the form of a block diagram, the setup of the present invention for an active steering and for a power steering.

The configuration of the present invention is represented in FIG. 2. In FIG. 2, the upper block diagram characterizes the configuration for a vehicle equipped with an active steering system, and the lower block diagram characterizes the configuration for a vehicle equipped with a power steering system. In each case, 201 characterizes the driver of the vehicle identified by 200. Under block 201, block 202 in the two block diagrams identifies a speed sensor or a tire pressure sensor. Its output signals are processed in both block diagrams in a tire pressure monitoring system 203, designated by TPMS, if necessary, also using additional data, and from this a conclusion may be drawn as to whether there is a sudden tire pressure drop. In the upper diagram, as a function of this, in block 205, i.e. in the control unit of the active steering system, if necessary, using additional sensor date, an auxiliary steering angle is ascertained, which is superimposed on the driver's steering angle in block 207. In the lower diagram, the output signal of tire pressure monitoring system 203 is passed on to a control unit 204, which ascertains the boost factor of the power steering system and actuates power steering system 206 with this.

What is claimed is:

1. A method for adapting a boost rate of a steering system of a motor vehicle during tire pressure loss, the method comprising: ascertaining, via an ascertaining arrangement, an occurrence of a tire pressure loss, wherein the intensity of the pressure loss exceeds a specified threshold value; and reducing, via a reducing arrangement, if the pressure loss exceeds the threshold value, the boost factor of the steering system.

2. The method of claim 1, wherein the reduction over time of the boost factor takes place according to a specified function.

3. The method of claim 1, wherein the reduced boost factor is maintained during a time interval of specified length.

4. The method of claim 1, wherein the reduced boost factor is retained until a stable driving state of the motor vehicle is detected.

5. The method of claim 1, wherein the reduced boost factor is retained until the vehicle longitudinal speed falls below a specified threshold value.

6. The method of claim 3, wherein after the expiration of the time interval of specified length and the reaching of a stable driving state or the falling below a specified threshold value by the vehicle's longitudinal speed, the boost factor is raised again over time according to a specified function.

7. The method of claim 6, wherein the value, raised again, of the boost factor is less than the standard value of the boost factor when there is no tire pressure loss present.

8. The method of claim 1, wherein the steering system is a power steering system or an active steering system.

9. The method of claim 1, wherein the threshold value for the pressure loss is selected to be so high that, when it is exceeded, a nearly pressure-less tire or a burst tire is present.

10. The method of claim 1, wherein the driver is informed on the reduction of the boost factor.

11. The method of claim 1, wherein the reduction over time of the boost factor takes place according to a specified function, which is a linear function.

12. A device for adapting a boost rate of a steering system of a motor vehicle during tire pressure loss, comprising:
an ascertaining arrangement to ascertain an occurrence of a tire pressure loss, wherein the intensity of the pressure loss exceeds a specified threshold value; and
a reducing arrangement to reduce, if the pressure loss exceeds the threshold value, the boost factor of the steering system.

* * * * *